(12) United States Patent
Lutz

(10) Patent No.: US 11,567,464 B2
(45) Date of Patent: Jan. 31, 2023

(54) BACK ANNOTATION OF OPERATOR SELECTIONS

(71) Applicant: Siemens Aktiengesellschaft, Munich (DE)

(72) Inventor: Benjamin Lutz, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 154 days.

(21) Appl. No.: 17/190,613

(22) Filed: Mar. 3, 2021

(65) Prior Publication Data

US 2021/0278812 A1 Sep. 9, 2021

(30) Foreign Application Priority Data

Mar. 4, 2020 (EP) ..................... 20160833

(51) Int. Cl.
*G05B 15/02* (2006.01)
*G06F 9/451* (2018.01)
*H04L 67/10* (2022.01)

(52) U.S. Cl.
CPC ............ *G05B 15/02* (2013.01); *G06F 9/451* (2018.02); *H04L 67/10* (2013.01)

(58) Field of Classification Search
CPC .......... G05B 15/02; G06F 9/451; H04L 67/10
See application file for complete search history.

(56) References Cited

U.S. PATENT DOCUMENTS

| 8,375,397 | B1* | 2/2013 | Mendes da Costa ....................... H04L 65/403 719/310 |
| 8,868,608 | B2* | 10/2014 | Friedman ............ G06F 11/3664 718/1 |
| 2002/0126135 | A1* | 9/2002 | Ball .................... H04N 1/32512 345/600 |

(Continued)

FOREIGN PATENT DOCUMENTS

EP 3567441 11/2019

OTHER PUBLICATIONS

EP Search Report dated Oct. 19, 2020 based on EP 20160833 filed Mar. 4, 2020.

*Primary Examiner* — Tuan C Dao
(74) *Attorney, Agent, or Firm* — Cozen O'Connor

(57) ABSTRACT

A method for operating a control system of a technical installation, wherein an operator station server transfers visualization information to an operator station client, and the operator station client generates a graphical presentation for an operator via the visualization information, where the method includes adjusting the graphical presentation via the operator station client in response to an instruction of the operator to the operator station client, transmitting the information regarding the adjustment of the graphical presentation to the operator station server via the operator station client, recording the information received from the operator station client regarding the adjustment of the graphical presentation in a memory of the operator station (Continued)

server, transmitting the information regarding the adjustment of the graphical presentation to the engineering station server via the operator station server, and presenting the information regarding the adjustment of the graphical presentation to a project engineer of the technical installation.

14 Claims, 2 Drawing Sheets

(56) References Cited

U.S. PATENT DOCUMENTS

| | | | |
|---|---|---|---|
| 2002/0129129 A1* | 9/2002 | Bloch | H04L 9/40 |
| | | | 709/218 |
| 2002/0161835 A1* | 10/2002 | Ball | H04N 1/32529 |
| | | | 707/999.01 |
| 2006/0031187 A1* | 2/2006 | Pyrce | G06F 3/04815 |
| 2008/0184222 A1* | 7/2008 | LaManna | G06F 8/61 |
| | | | 717/174 |
| 2009/0006070 A1* | 1/2009 | Sasatani | G06F 8/61 |
| | | | 703/22 |
| 2010/0082125 A1 | 4/2010 | Pingel et al. | |
| 2019/0101910 A1 | 4/2019 | Schleiss et al. | |
| 2019/0339674 A1 | 11/2019 | Lutz et al. | |

* cited by examiner

BACK ANNOTATION OF OPERATOR SELECTIONS

BACKGROUND OF THE INVENTION

1. Field of the Invention

The invention relates to a control system of a technical installation, in particular a manufacturing or process installation and to a method for operating the control system of the technical installation.

2. Description of the Related Art

In order to improve operator control and monitoring, operators may create and optimize what are known as user selections at runtime of a technical installation. The user selections include, for example, trend displays and message sequence displays. An operator is thus able to compile optimized trend displays in a successive manner for example, which can be used to improve the operator control and monitoring.

Although user selections of this kind are efficient, they are in most cases restricted to the operator who has created them, they can purely be used at runtime of the technical installation and cannot be relocated between different (engineering) projects, and they are subject to complex care and maintenance when (process) objects are relocated or deleted during engineering, for example.

SUMMARY OF THE INVENTION

It is an object of the invention is to provide a control system for a technical plant, in particular a manufacturing or process plant, which will provide consistency of visualization information in the context of a server-client connection in compliance with the Model-View-Controller (MVC) scheme and without significant loss of performance.

In view of the foregoing, it is therefore an object of the invention to provide a control system of a technical installation and an associated method, via which a more efficient operator control and monitoring of the technical installation is possible.

This and other objects and advantages are achieved in accordance with the invention by a control system of a technical installation, in particular a manufacturing or process installation, and by a method for operating a control system of the technical installation, in particular the manufacturing or process installation.

The control system comprises at least one operator station server, at least one operator station client and at least one engineering station server, where the operator station server is configured to transfer visualization information to the operator station client. The operator station client is also configured to generate a graphical presentation for an operator of the technical installation via the visualization information. The operator station client is additionally configured to adjust the graphical presentation in response to an instruction of the operator to the operator station client. The operator station client is furthermore configured to transmit an item of information regarding the adjustment of the graphical presentation to the operator station server. The operator station server is also configured to record the information received from the operator station client regarding the adjustment of the graphical presentation in a memory of the operator station server.

In accordance with the invention, the operator station server of the control system is configured to transmit the information regarding the adjustment of the graphical presentation to the engineering station server, in order to make the information regarding the adjustment of the graphical presentation available to a project engineer of the technical installation.

The technical installation can be an installation from the process industry, such as a chemical, pharmaceutical or petrochemical installation, or an installation from the food and beverage industry, for example. This also encompasses any installations from the production industry, factories in which, for example, automobiles or goods of all kinds are produced. Technical installations that are suitable for implementing the method in accordance with the invention can also come from the power generation sector. The term "technical installation" also encompasses wind turbines, solar installations or power generation plants.

These installations each have a control system or at least a computer-aided module for open-loop and closed-loop control of the running process or production. Part of the control system or control module or of a technical installation is at least one database or archive in which historical data is stored.

In the present context, an "operator station server" is understood to mean a server that centrally captures data of an operator control and monitoring system and generally also alarm and measured value archives of a control system of a technical installation, and makes this data available to users. The operator station server generally establishes a communication connection to automation systems of the technical installation and forwards data of the technical installation to "clients" for the purpose of operator control and monitoring of an operation of the individual function elements of the technical installation. The operator station server can have client functions for accessing the data (archives, messages, tags, variables) of other operator station servers. This means that images of an operation of the technical installation on the operator station server can be combined with variables of other operator station servers (server-server communication). The operator station server can be a SIMATIC PCS 7 industrial workstation server from SIEMENS, without being restricted to this.

In the present context, an "engineering station server" is understood to mean a server that is configured to create, administer, archive and document various hardware and software projects (engineering projects) for a process control system of a technical installation. With the aid of special software design tools (engineering toolset) as well as modules and plans prepared in advance, an interaction of control devices and facilities of the technical installation can be planned and administered by means of the engineering station server. An example of this is a SIMATIC manager server from SIEMENS.

In the present context, a control system is understood to be a computer-aided technical system, which comprises functionalities for representing, operating and controlling a technical manufacturing or production installation. The control system generally comprises sensors for determining measurement values, as well as various actuators. The control system may also comprise what are known as process or manufacture-oriented components, which serve to activate the actuators or sensors. Furthermore, the control system has inter alia devices for visualizing the technical installation (operator station server and client) and for engineering (engineering station server). The term control system is additionally intended to also encompass further computing units for more complex closed-loop controls and systems for data storage and data processing.

The visualization information may comprise graphical representations of components of the technical installation, for example. These are provided and/or compiled by the operator station server and transferred to the operator station client, which uses the visualization information to generate a graphical presentation for an operator of the technical installation. This graphical presentation may be visually presented to the operator on a computer monitor, a tablet or a smartphone, for example. The graphical presentation may represent an installation image of the technical installation, for example.

The operator may make changes/adjustments to this graphical presentation by directing instructions to the operator station client. Such an instruction may involve a selection of a trend display and/or a message sequence display, for example.

The user selections arising at runtime of the technical installation or adjustments of the graphical presentation of the visualization information may be among the "most efficient" for the operator control and monitoring of the technical installation. Consequently, the core of the invention lies in providing these adjustments to the engineering station server as regular graphical presentations or installation images at suitable places.

For example, the operator may generate and compile new (individual) trend displays or message sequence displays (user selections) to improve their operator control and monitoring. These user selections are then made persistent in a memory of the operator station server and forwarded to the engineering station server. Here, a selection option is provided by the operator station client to the effect that the operator can actively select whether the changes they have made are to be forwarded to the engineering station server.

The information transmitted from the operator station server to the engineering station server regarding the adjustment of the graphical presentation (then) may be available to the project engineer in the context of a technological hierarchy of components of the technical installation. This information is thereby available for the loading of an installation image generated from the information into the operator station server in the context of an engineering project.

Process objects to be configured of a process installation that is to be controlled, e.g., process objects in the form of measuring points, tanks, valves, sensors, actuators, as well as further objects of the control system, for example, installation images, structure folders, what are known as continuous function charts (CFCs), sequential function charts (SFCs) and batch objects, for example, are present in the technological hierarchy of the engineering station server in a hierarchically structured manner.

It is also an object of the invention to provide a method for operating a control system of a technical installation, in particular a manufacturing or process installation, which comprises at least one operator station server, at least one operator station client and at least one engineering station server, where the operator station server is configured to transfer visualization information to the operator station client, and where the operator station client is configured to generate a graphical presentation for an operator of the technical installation via the visualization information, and where the method particularly comprises a) adjusting the graphical presentation via the operator station client in response to an instruction of the operator to the operator station client, b) transmitting the information regarding the adjustment of the graphical presentation to the operator station server by way of the operator station client, c) recording the information received from the operator station client regarding the adjustment of the graphical presentation in a memory of the operator station server, d) transmitting the information regarding the adjustment of the graphical presentation to the engineering station server by way of the operator station server, and e) presenting the information regarding the adjustment of the graphical presentation to a project engineer of the technical installation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now be made more clearly and distinctly intelligible in conjunction with the following description of the exemplary embodiment, which will be described in detail making reference to the drawings, in which.

DETAILED DESCRIPTION OF THE EXEMPLARY EMBODIMENTS

Figure 1:
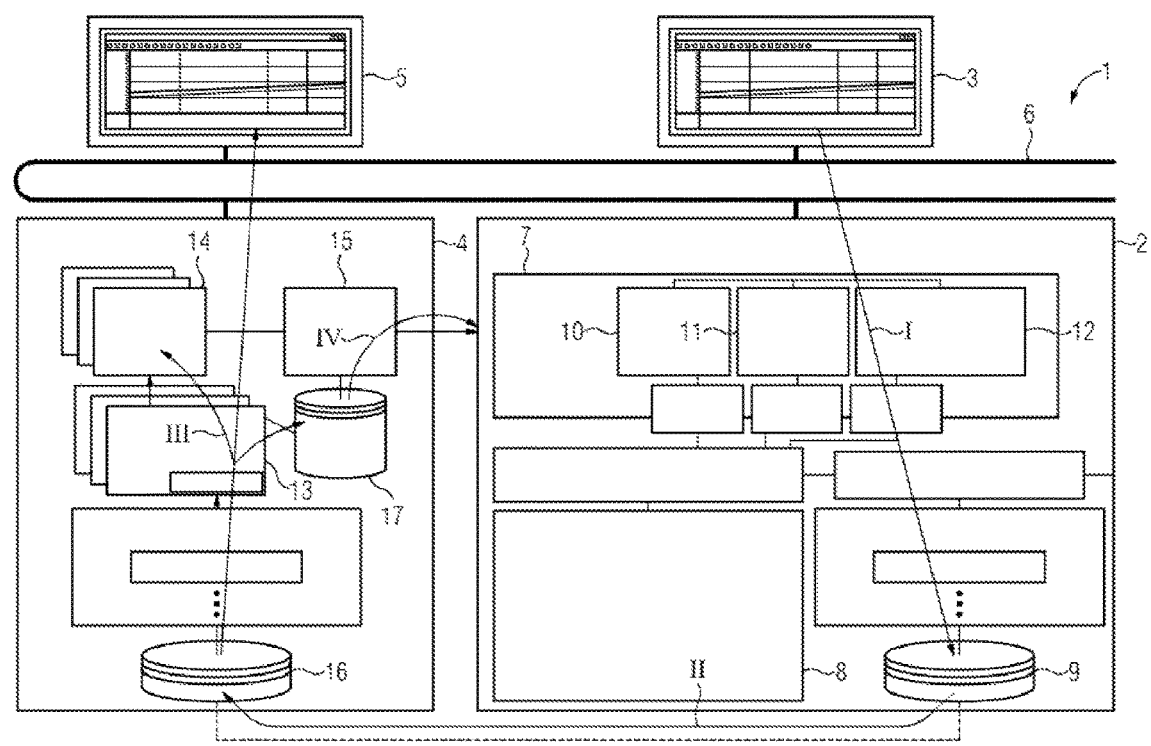
FIG. 1 is a schematic block diagram of the control system in accordance with the invention.

FIG. 1 shows part of a control system 1 in accordance with the invention of a technical installation configured as a process installation. The control system 1 comprises a server of an operator control system or an operator station server 2 and an operator station client 3 associated therewith. The control system 1 additionally includes an engineering station server 5 and an associated engineering station client 6. The operator station server 2, the operator station client 3, the engineering station server 4 and the engineering station client 5 are connected to one another via a terminal bus 6 and to further components (not shown) of the control system 1, such as a process data archive.

A user or operator has access to the operator station server 2 via the operator station client 3 over the terminal bus 6, in the context of operator control and monitoring. In an analogous manner, a project engineer has access to the engineering station server 4 via the engineering station client 5 over the terminal bus 6, in the context of engineering. The terminal bus 6 can be configured as an industrial Ethernet for example, without being restricted thereto.

Integrated in the operator station server 2 is a visualization service 7, via which visualization information is transferred to the operator station client 3. The operator station server 2 also has a process image 8, a local memory 9, an alarm service 10, a trend display service 11 and a user selection service 12. Recorded in the process image 8 of the operator station server 2 is a snapshot of the (signal) states of devices and/or applications (not shown FIG. 1) connected to the operator station server 2. The alarm service 10 reads alarm messages from the process image 8 and generates a graphical aggregation of the alarm messages, for example. The trend display service 11 generates trend displays from process values that it reads from the process image 8. The user selection service 12 comprises a database, in which user profiles and personal settings of operators/users of the process installation are recorded. These may also be accessible to further operators/users.

Integrated in the engineering station server 4 is an engineering service 13, via which a project engineer has access to a technological hierarchy 14 recorded in the engineering station server 4 in the context of an engineering of the process installation, in order to extract process objects (types) or the like from the hierarchy for the engineering of the process installation. Additionally, the engineering station server 4 has a loading service 15 and a first memory 16 and a second memory 17, the functionality of which is indicated below.

The method in accordance with the invention may proceed as follows, for example:

In a first step I, an operator adjusts a graphical presentation of visualization information represented on the operator station client 3. The operator determines that the user selection that has been made is to be used for back annotation into the engineering station server 4. The information received from the operator station client 3 regarding the adjustment of the graphical presentation is recorded in the memory 9 of the operator station server 2.

The user selection previously recorded in the memory 9 is mirrored in the first memory 16 of the engineering station server 4 in a second step II.

In a third step III, an installation image is automatically generated from the received user selection via the engineering service 13, embedded into the technological hierarchy 14 and recorded in the second memory 17. Optionally, the automatically generated installation image may be modified by the project engineer. In the course of the automatic generation, the following context is taken into consideration:

i) The name of the installation image consequently corresponds to the name of the user selection specified at runtime and to the author name of the operator who has applied or recently changed the user selection.

ii) Furthermore, the unique identification number of the user selection is also allocated to the automatically generated installation image, so that updates are also possible. If an operator further optimizes their user selection at runtime (e.g., incorporating a further process value into a trend display, changing a trend-based alarm threshold, etc.), then this should also be able to contribute to the updating of the automatically generated installation image in the engineering—a unique identification is necessary for this purpose.

In a fourth step IV, the automatically generated installation image is loaded from the second memory 17 by the loading service 15 and transferred to the operator station server 2.

The above-described generated installation image may be automatically embedded at a point in the technological hierarchy 14 in the engineering station server 4. Due to the automatic embedding in the technological hierarchy 14, the loading is implicitly also automatically assigned in the image hierarchy and assigned to an operator station server 2. The automatically generated installation image is therefore also automatically available without further engineering steps (excluding relocations along the technological hierarchy 14) in the engineering and at runtime (following the usual generation and loading into the respective operator station server 2).

The assignment of the automatically generated installation image in the technological hierarchy 14 is derived based on the process values present in the installation image (e.g., in trend displays) or process alarm filters (e.g., in message sequence displays) of the process objects. If a trend display of a process value is present, for example, then the process value is unambiguously assigned to a process object. The process object itself is assigned to a specific point by its path in the technological hierarchy 14.

For example, the process object "MonAnS1" (analogue value monitor) may possess the path "installation 1/sub-installation 1/technical facility 1/MonAns1" in the technological hierarchy 14. An automatically generated installation image is therefore assigned under the same path in the technological hierarchy 14. If a number of process values of different process objects are now present in an installation image (e.g., in a common trend display or a plurality of different trend displays), then the allocation of the automatically generated installation image to a point in the technological hierarchy 14 derives from the "intersection" of the technological path of the process objects. Examples include:

"MonAnS1" (analogue value monitor" with path: "installation 1/sub-installation 1/technical facility 1/MonAns1"

"PID1" (regulator) with path: "installation 1/sub-installation 1/technical facility 2/PID1"

intersection: "installation 1/sub-installation 1/"

This means that the automatically generated installation image is automatically (initially) assigned to the path "installation 1/sub-installation 1/" in the technological hierarchy 14. As described, this path may also be further modified by a project engineer following the initial assignment by a project engineer in engineering.

Figure 2:
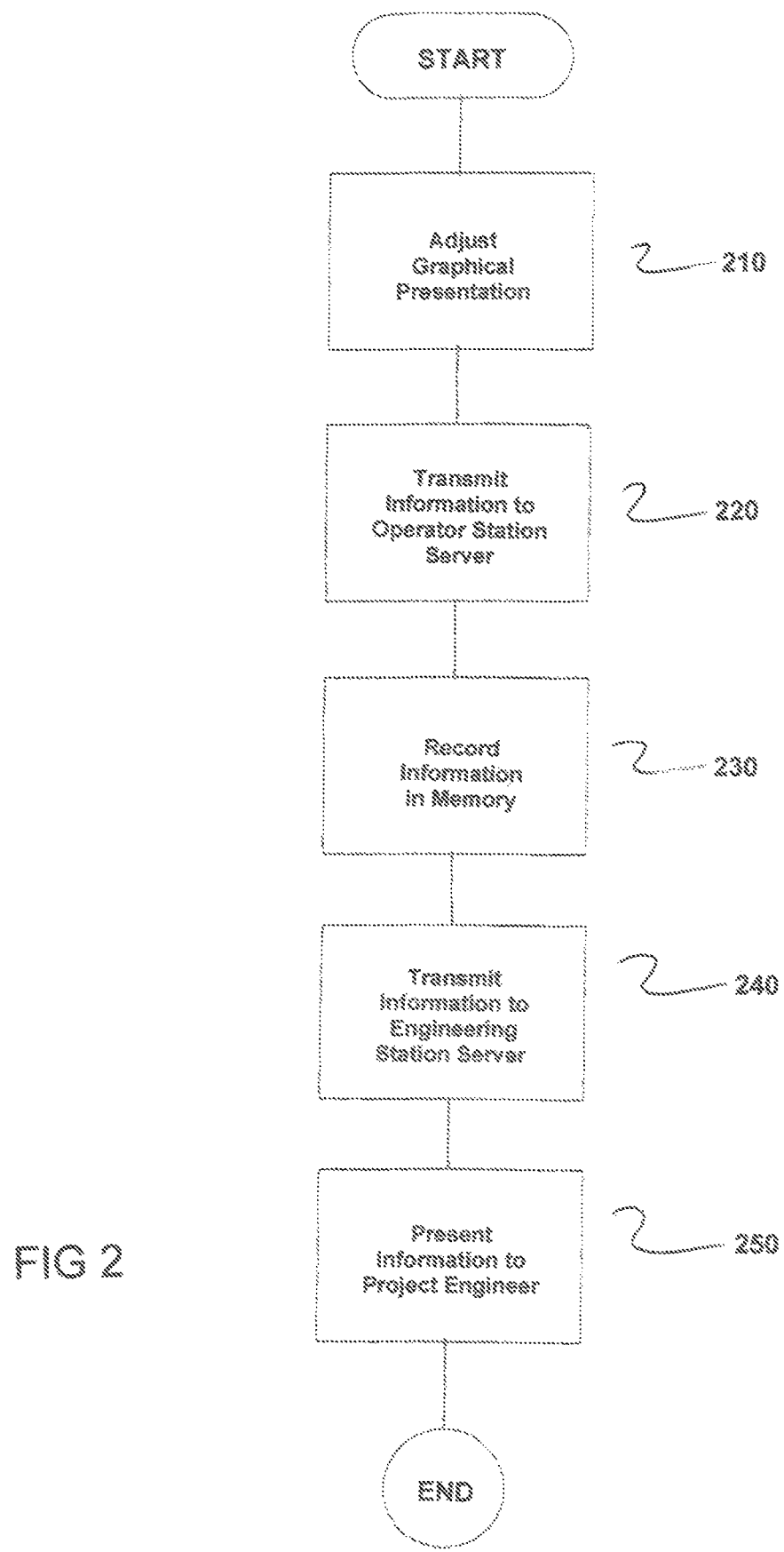
FIG. 2 is a flowchart of the method in accordance with the invention.

FIG. 2 is a flowchart of the method for operating a control system 1 of a technical installation comprising at least one operator station server 2, at least one operator station client 3 and at least one engineering station server 4, where the at least one operator station server 2 is configured to transfer visualization information to the at least one operator station client 3, and the at least one operator station client 3 is configured to generate a graphical presentation for an operator of the technical installation via the visualization information.

The method comprises adjusting the graphical presentation via the at least one operator station client 3 in response to an instruction of the operator to the at least one operator station client 3, as indicated in step 210.

Next, the information regarding the adjustment of the graphical presentation is transmitted to the at least one operator station server 2 via the at least one operator station client 3, as indicated in step 220.

Next, the information received from the operator station client 3 regarding the adjustment of the graphical presentation is recorded in a memory 9 of the at least one operator station server 2, as indicated in step 230.

Next, the information regarding the adjustment of the graphical presentation is transmitted to the engineering station server 4 via the at least one operator station server 2, as indicated in step 240.

Next, the information regarding the adjustment of the graphical presentation is presented to a project engineer of the technical installation, as indicated in step 250.

Thus, while there have been shown, described and pointed out fundamental novel features of the invention as applied to a preferred embodiment thereof, it will be understood that various omissions and substitutions and changes in the form and details of the methods described and the devices illustrated, and in theft operation, may be made by those skilled in the art without departing from the spirit of the invention. For example, it is expressly intended that all combinations of those elements and/or method steps which perform substantially the same function in substantially the same way to achieve the same results are within the scope of the invention. Moreover; it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system of a technical installation, comprising:
at least one operator station server;
at least one operator station client; and
at least one engineering station server;
wherein the at least operator station server is configured to transfer visualization information to at least the operator station client;
wherein the at least operator station client is configured to generate a graphical presentation for an operator of the technical installation via the visualization information;
wherein the operator station client is further configured to adjust the graphical presentation in response to an instruction of the operator to the at least operator station client;
wherein the at least operator station client is further configured to transmit an item of information regarding an adjustment of the graphical presentation to the at least operator station server;
wherein the at least operator station server is further configured to record the information received from the at least operator station client regarding the adjustment of the graphical presentation in a memory (9) of the at least operator station server; and
wherein the at least one operator station server is further configured to transmit the information regarding the adjustment of the graphical presentation to the at least engineering station server to make the information regarding the adjustment of the graphical presentation available to a project engineer of the technical installation.

2. The control system as claimed in claim 1, wherein the graphical presentation represents an installation image of the technical installation.

3. The control system as claimed in claim 1, wherein an instruction of the operation comprises a selection of at least one of (i) a trend display and (ii) message sequence display.

4. The control system as claimed in claim 2, wherein an instruction of the operation comprises a selection of at least one of (i) a trend display and (ii) message sequence display.

5. The control system as claimed in claim 1, wherein the information transmitted from the at least one operator station server to the at least one engineering station server regarding the adjustment of the graphical presentation is available to the project engineer in a context of a technological hierarchy of components of the technical installation.

6. The control system as claimed in claim 1, where the technical installation comprises a manufacturing or process installation.

7. A method for operating a control system of a technical installation comprising at least one operator station server, at least one operator station client and at least one engineering station server, the at least one operator station server being configured to transfer visualization information to the at least one operator station client, and the at least one operator station client being configured to generate a graphical presentation for an operator of the technical installation via the visualization information, the method comprising:
a) adjusting the graphical presentation via the at least one operator station client in response to an instruction of the operator to the at least one operator station client;
b) transmitting the information regarding the adjustment of the graphical presentation to the at least one operator station server via the at least one operator station client;
c) recording the information received from the operator station client regarding the adjustment of the graphical presentation in a memory of the at least one operator station server;
d) transmitting the information regarding the adjustment of the graphical presentation to the engineering station server via the at least one operator station server; and
e) presenting the information regarding the adjustment of the graphical presentation to a project engineer of the technical installation.

8. The method as claimed in claim 7, wherein the graphical presentation represents an installation image of the technical installation.

9. The method as claimed in claim 7, wherein an instruction of the operation comprises a selection of at least one of (i) a trend display and (ii) a message sequence display.

10. The method as claimed in claim 8, wherein an instruction of the operation comprises a selection of at least one of (i) a trend display and (ii) a message sequence display.

11. The method as claimed in claim 7, wherein the information transmitted from the at least one operator station server to the at least one engineering station server regarding the adjustment of the graphical presentation is made available to the project engineer in a context of a technological hierarchy of components of the technical installation.

12. The method as claimed in claim 8, wherein the information transmitted from the at least one operator station server to the at least one engineering station server regarding the adjustment of the graphical presentation is made available to the project engineer in a context of a technological hierarchy of components of the technical installation.

13. The method as claimed in claim 9, wherein the information transmitted from the at least one operator station server to the at least one engineering station server regarding the adjustment of the graphical presentation is made available to the project engineer in a context of a technological hierarchy of components of the technical installation.

14. The method as claimed in claim 7, wherein the technical installation comprises a manufacturing or process installation.

* * * * *